(12) United States Patent
Odagiri et al.

(10) Patent No.: US 7,887,195 B2
(45) Date of Patent: Feb. 15, 2011

(54) PROJECTION DISPLAY WITH MECHANISM AND IMAGE PROCESSOR FOR ADJUSTING AN IMAGE IN SIX DEGREES OF FREEDOM, AND ADJUSTING METHOD THEREOF

(75) Inventors: Kensuke Odagiri, Tokyo (JP); Akihiro Kitaguchi, Tokyo (JP); Yoshinori Asamura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 930 days.

(21) Appl. No.: 11/806,199

(22) Filed: May 30, 2007

(65) Prior Publication Data
US 2008/0074623 A1    Mar. 27, 2008

(30) Foreign Application Priority Data
Sep. 22, 2006    (JP)    ............... 2006-256727

(51) Int. Cl.
G03B 21/14    (2006.01)
(52) U.S. Cl. ............... 353/79; 353/69; 353/70
(58) Field of Classification Search .......... 353/79, 353/69–70
See application file for complete search history.

(56) References Cited
U.S. PATENT DOCUMENTS

2002/0001067 A1* 1/2002 Tachibana ............... 353/101
2006/0197920 A1* 9/2006 Furui et al. .............. 353/69
2006/0209268 A1* 9/2006 Raskar et al. ............ 353/69
2007/0273845 A1* 11/2007 Birmingham ............ 353/101

FOREIGN PATENT DOCUMENTS

JP    11-341403 A    12/1999
JP    2004-347743 A    12/2004

* cited by examiner

*Primary Examiner*—Georgia Y Epps
*Assistant Examiner*—Kevin Wyatt
(74) *Attorney, Agent, or Firm*—Birch, Stewart, Kolasch and Birch, LLP

(57) ABSTRACT

A projection display includes a projection unit projecting an image on a screen, an image processor capable of adjusting an image display area where an image is projected on the screen by processing an image signal to be input to the projection unit, and an image-outline adjusting mechanism supporting the projection unit and capable of adjusting the image display area by positioning the projection unit. The image processor is capable of adjusting the image display area in one translational degree of freedom, and the image-outline adjusting mechanism is capable of positioning the projection unit in five degrees of freedom except for one translational degree of freedom.

7 Claims, 13 Drawing Sheets

F I G . 1
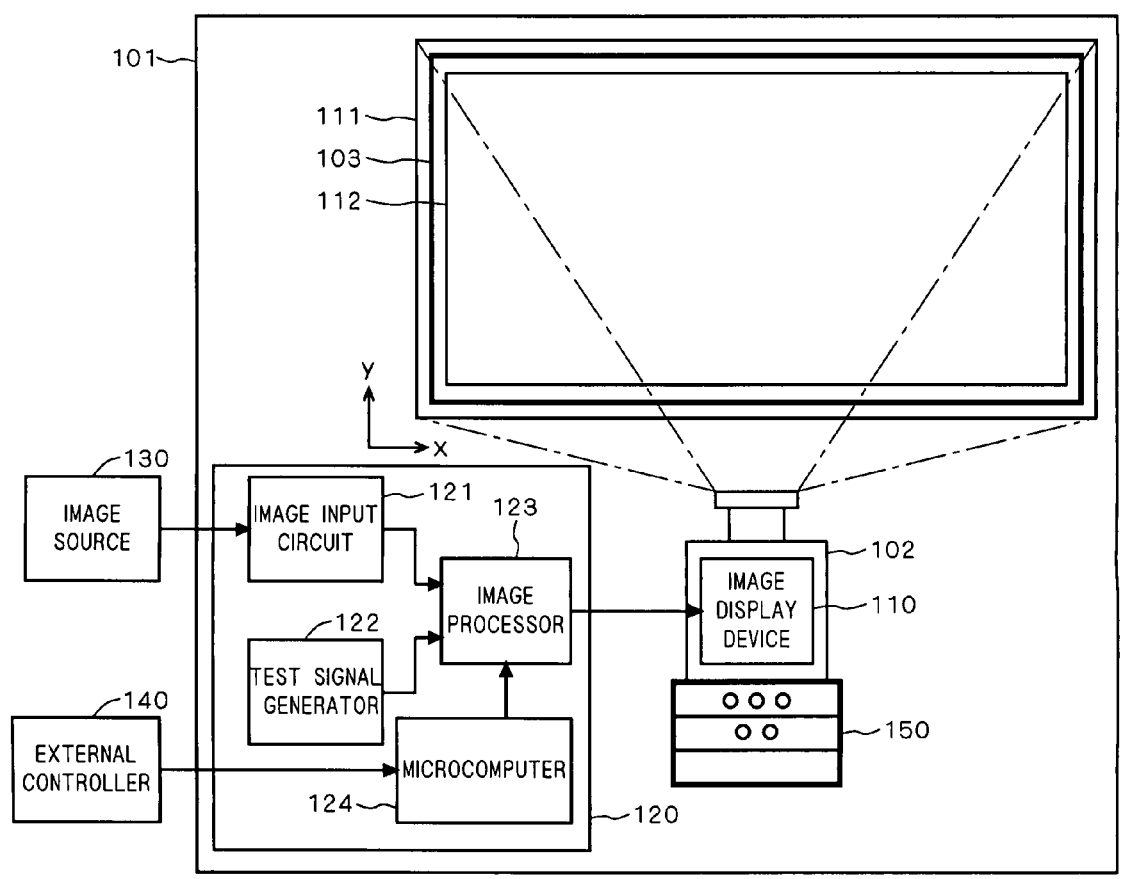

F I G . 3
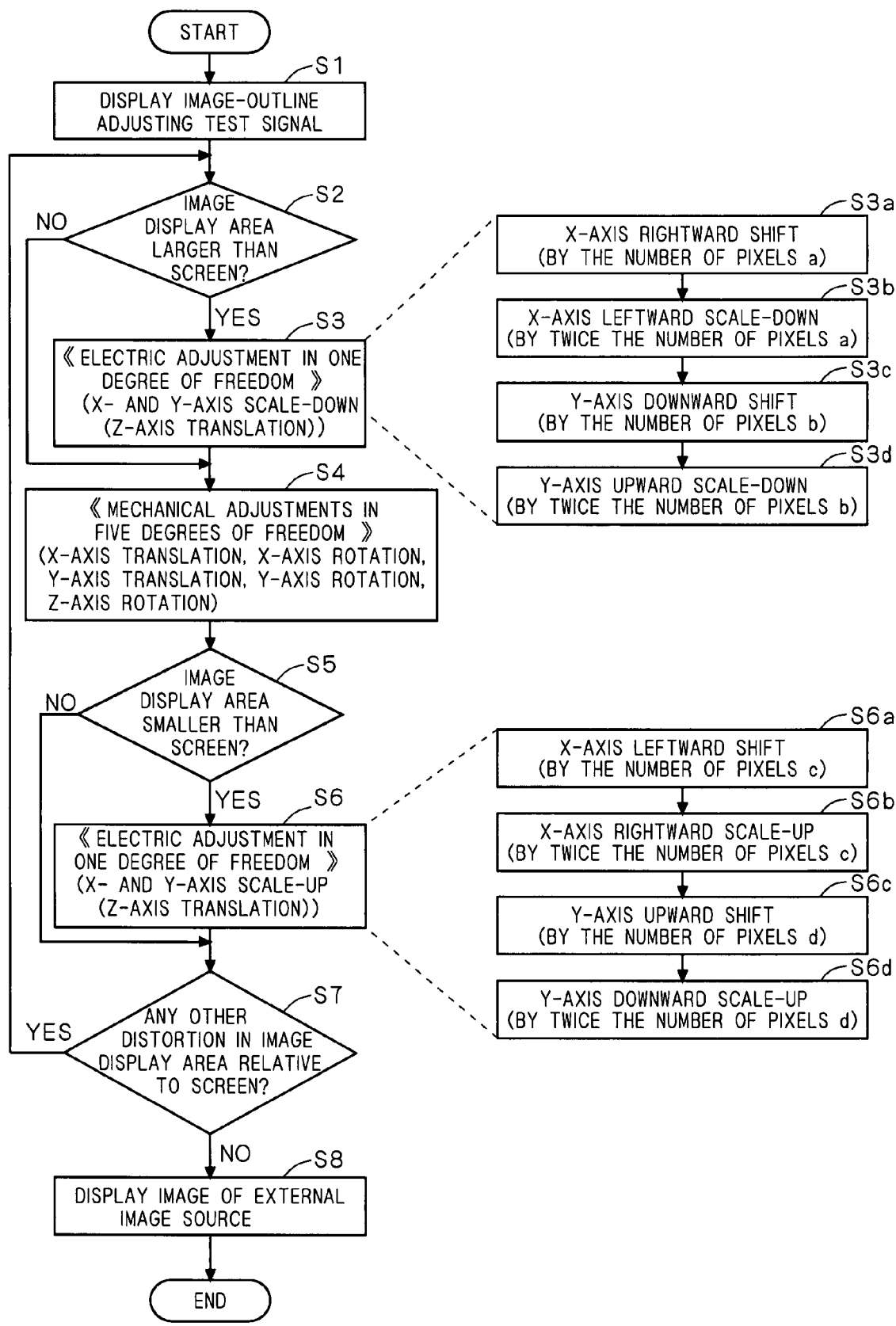

PROJECTION DISPLAY WITH MECHANISM AND IMAGE PROCESSOR FOR ADJUSTING AN IMAGE IN SIX DEGREES OF FREEDOM, AND ADJUSTING METHOD THEREOF

FIELD OF THE INVENTION

The present invention relates to a projection display whose projection unit projects an image on the rear surface of a screen to thereby display the image, and also relates to a method of adjusting the same.

DESCRIPTION OF THE BACKGROUND ART

A conventional projection display requires a projection unit to be adjusted in six degrees of freedom individually so that an image out of the projection unit is projected in alignment with a screen without distortion. Japanese Patent Application Laid-Open No. 2004-347743 (pp. 3-9, FIG. 1) discloses a projection display achieving adjustments in three translational degrees of freedom and three rotational degrees of freedom by mechanical operations of an image-outline adjusting mechanism, thereby positioning a projection unit in six degrees of freedom in total. Japanese Patent Application Laid-Open No. 11-341403 (1999) (pp. 3-5, FIG. 1) discloses a projection display capable of achieving adjustments in degrees of freedom by processing an image signal, so that an image to be projected is adjusted.

For achieving mechanical adjustments in six degrees of freedom by an image-outline adjusting mechanism as disclosed in the above-mentioned JP2004-347743, a moving panel for each degree of freedom, i.e., a total of six moving panels or rotating panels are required. This increases the number, mass and costs of components. In such image-outline adjusting mechanism, the largest number of components is used particularly for an adjusting part along the z-axis extending in the front-to-rear direction relative to the screen, making the z-axis adjustment difficult. The z-axis adjustment thus requires much time, and is most likely to cause displacements in image outline due to shakes or, drops during transportation of products.

In contrast, electric image-outline adjustments by processing an image signal to be input to a projection unit as disclosed in the above-mentioned JP11-341403 (1999) reduces the number, mass and costs of components. However, a rotational distortion or trapezoidal distortion on the screen, if any, is difficult to be corrected by signal processing; even if it is not impossible, a displayed image is significantly degraded in quality.

SUMMARY OF THE INVENTION

An object of the present invention is to reduce the number, mass and costs of components constituting an image-outline adjusting mechanism, thereby facilitating z-axis adjustment, and to prevent degradation in quality of displayed image while correcting a rotational distortion or trapezoidal distortion.

According to the present invention, the projection display includes a projection unit projecting an image on a screen, an image processor capable of adjusting an image display area where an image is projected on the screen by processing an image signal to be input to the projection unit, and an image-outline adjusting mechanism supporting the projection unit and capable of adjusting the image display area by positioning the projection unit. The image processor is capable of adjusting the image display area in one translational degree of freedom. The image-outline adjusting mechanism is capable of positioning the projection unit in five degrees of freedom except for the one translational degree of freedom.

This reduces the number, mass and costs of components constituting the image-outline adjusting mechanism, thereby facilitating axis adjustment, e.g., z-axis adjustment, and prevents degradation in quality of displayed image while correcting a rotational distortion or trapezoidal distortion.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram showing a projection display according to a first preferred embodiment;

FIG. 3 is a flow chart showing a method of adjustment of the projection display according to the first preferred embodiment;

DESCRIPTION OF THE PREFERRED EMBODIMENTS

First Preferred Embodiment

Figure 2:
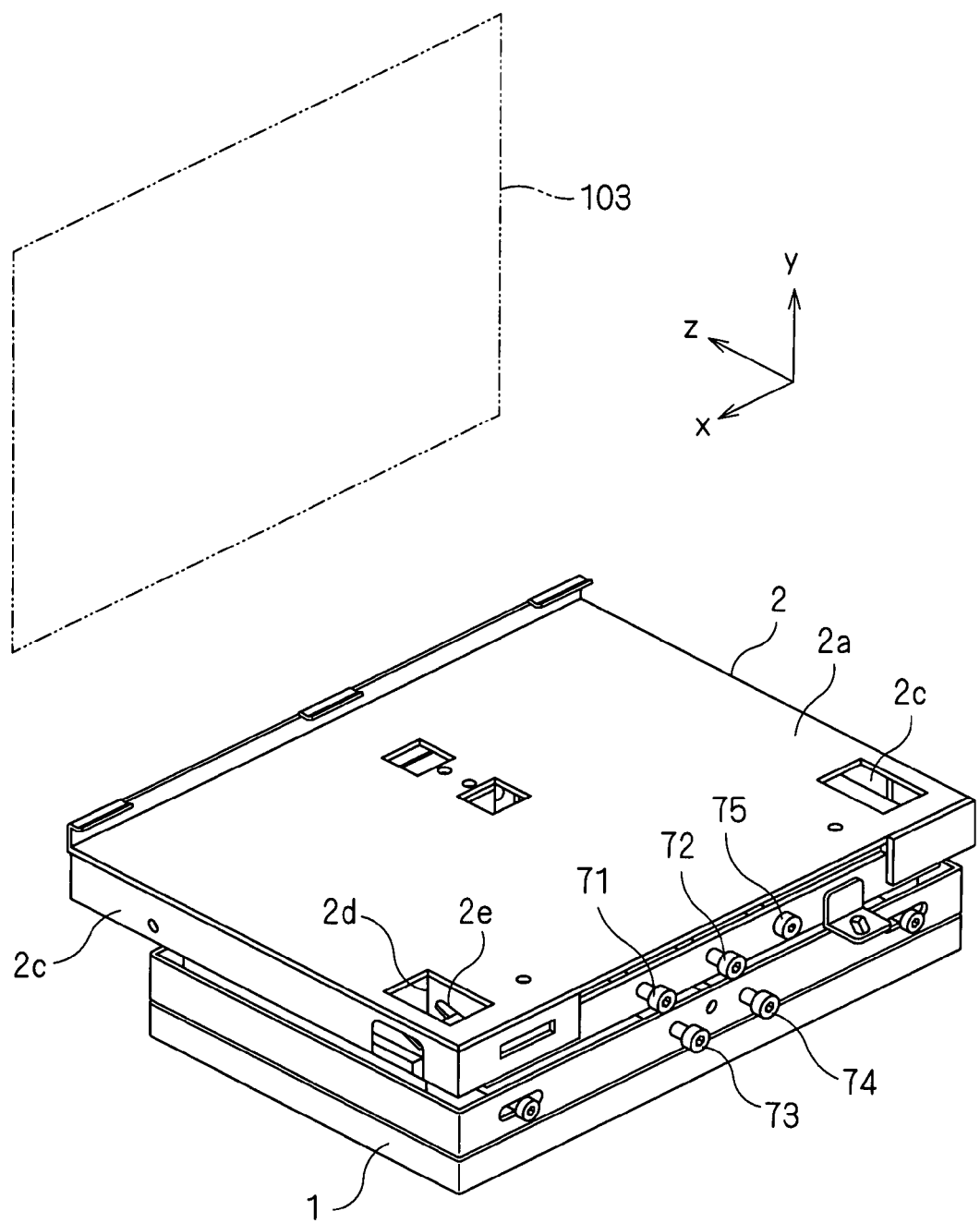
FIG. 2 is a perspective view showing an image-outline adjusting mechanism of the projection display according to the first preferred embodiment.

FIG. 1 is a block diagram showing a projection display according to the present embodiment. As shown in the drawing, the projection display is mainly provided with a cabinet 101, a projection unit 102, a screen 103, an electric circuit unit 120 and an image-outline adjusting mechanism 150. The electric circuit unit 120 includes an image input circuit 121, a test signal generator 122, an image processor 123 and a microcomputer 124.

An image source 130 provided outside the projection display inputs an image signal to the image input circuit 121. The image input circuit 121 converts the received image signal into a digital signal, and outputs the digital signal to the image processor 123.

The image processor 123 is capable of selecting which one of the image signal converted by the image input circuit 121 and a test signal generated in digital form by the test signal generator 122 is to be input. The image processor 123 carries out image signal processing on the image signal or test signal such as scale-up/down of the resolution, and converts it into a digital signal in a required format, and outputs the digital signal to an image display device 110 provided in the projection unit 102. The image display device 110 is DMD™ (Digital Micromirror Device), for example.

The projection unit 102 projects an image on the screen 103 through the image display device 110. An external controller 140 controls the image projected out of the projection unit 102 via the microcomputer 124. The image projected out of the projection unit 102 and the screen 103 will now be described. An effective display area 111 is an area where the image display device 110 provides the largest display via the projection unit 102. An image display area 112 is an area where an image out of the projection unit 102 is practically projected on the screen 103. In an ideal state, the image display area 112 matches the screen 103.

The image processor 123 according to the present invention is capable of adjusting the image display area 112 by processing an image signal to be input to the projection unit 102. That is, the image processor 123 is capable of adjusting the image display area 112 in one translational degree of freedom. In the present embodiment, the image processor 123 scales up/down the image display area 112, to thereby adjust the image display area 112 in one translational degree of freedom in the front-to-rear direction relative to the screen 103. Herein, defining the left-to-right direction when viewing the screen 103 from outside the projection display as an x-axis, the top-to-bottom direction as a y-axis, and the front-to-rear direction as a z-axis, the image processor 123 adjusts the image display area 112 in one translational degree of freedom along the z-axis. More specifically, a shift on a pixel-by-pixel basis and scale-up/down on a pixel-by-pixel basis are carried out at the same time, to thereby adjust the image display area 112. To control the number of pixels, the microcomputer 124 controls the image processor 123 in response to an instruction received from the external controller 140 provided outside the projection display.

The image-outline adjusting mechanism 150 supports the projection unit 102, and mechanically positions the projection unit 102, to thereby adjust the image display area 112. In FIG. 1, the image-outline adjusting mechanism 150 is shown disposed under the projection unit 102 for supporting the projection unit 102. The image-outline adjusting mechanism 150 is capable of mechanically positioning the projection unit 102 in five degrees of freedom except for one translational degree of freedom achieved by the image processor 123. In the present embodiment, the image-outline adjusting mechanism 150 positions the projection unit 102 in five degrees of freedom in total, i.e., three rotational degrees of freedom and two translational degrees of freedom in parallel to the screen 103.

FIG. 2 is a perspective view showing the image-outline adjusting mechanism 150. The image-outline adjusting mechanism 150 moves a top plate 2 having a mounting surface 2a for mounting the projection unit 102 (not shown), to thereby position the projection unit 102. More specifically, the image-outline adjusting mechanism 150 is provided with an x-axis translating mechanism, an x-axis rotating mechanism, a y-axis translating mechanism, a y-axis rotating mechanism, and a z-axis rotating mechanism so as to position the top plate 2 in five degrees of freedom relative to the screen 103 (indicated by phantom line in FIG. 2) disposed in a predetermined area on the x-y plane along the x-, y- and z-axes shown in FIG. 2. Five circles illustrated in the image-outline adjusting mechanism 150 in FIG. 1 are shafts for adjusting these five mechanisms, and indicated by reference numerals 71, 72, 73, 74 and 75 in FIG. 2.

The shafts 74, 72 and 75 adjust x-, y- and z-axis rotations of the projection unit 102, respectively. The shafts 71 and 73 adjust x- and y-axis translations of the projection unit 102, respectively. The image-outline adjusting mechanism 150 thereby positions the projection unit 102 in three rotational degrees of freedom about the x-, y- and z-axes and two translational degrees of freedom along the x- and y-axes in parallel to the screen 103. While the image-outline adjusting mechanism 150 achieving such adjustment is constructed with one degree of freedom removed from a conventional mechanism, the rest of construction is similar to the conventional one, and redundant description is thus omitted here.

The aforementioned image-outline adjusting mechanism 150 limits one translational degree of freedom along the z-axis. The effective display area 111 thus depends upon the layout of the screen 103 and projection unit 102. Herein, the screen 103 and projection unit 102 are laid out such that the effective display area 111 is larger than the screen 103. Such layout allows the image display area 112, when falling within the effective display area 111 even outside the screen 103, to be scaled up/down by the image processor 123.

A method of adjustment achieved by the projection display according to the present embodiment of adjusting the image display area 112 to match the screen 103 by adjustments in six degrees of freedom, i.e., five degrees of freedom achieved by the image-outline adjusting mechanism 150 and one degree of freedom achieved by the image processor 123 will now be described with reference to the flow chart of FIG. 3.

Figure 4:
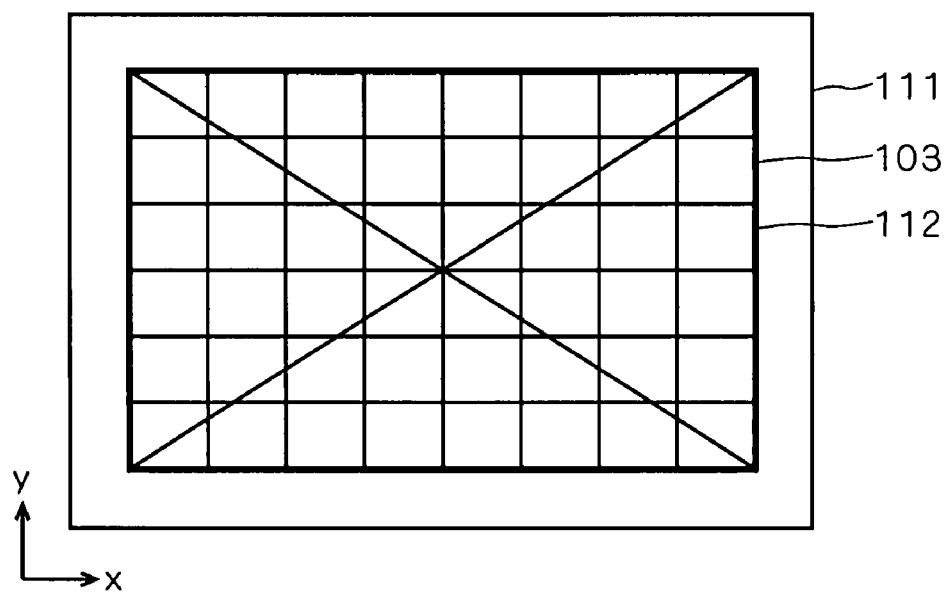
FIG. 4 is a diagram showing an image of a test signal of the projection display according to the first preferred embodiment.

First, the test signal generator 122 outputs an image-outline adjusting test signal, and in response to the signal, the projection unit 102 projects and displays an image as shown in FIG. 4, for example, on the screen 103 (step S1). Adjustments are carried out using the image display area 112 with such image. In this drawing, the outermost line of the image display area 112 matches that of the screen 103, which is an ideal state.

Figure 5A:
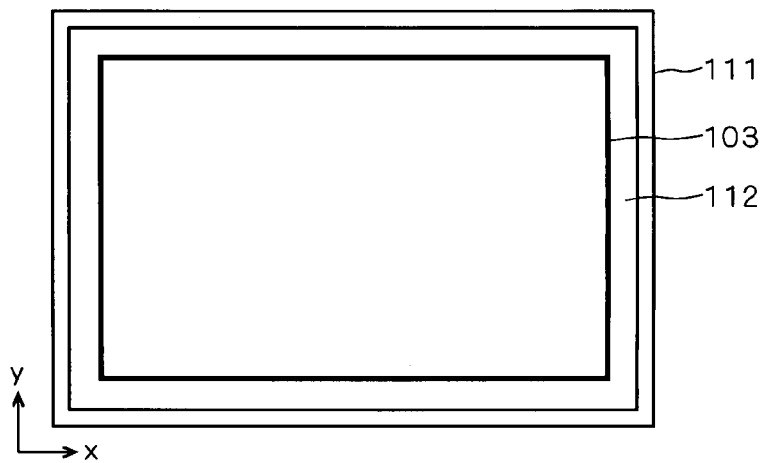
FIGS. 5A to 5C, 6 to 11, 12A to 12C and 13 are diagrams showing the method of adjustment of the projection display according to the first preferred embodiment.

Next, it is judged whether or not the image display area 112 is larger than the screen 103 (step S2). When the image display area 112 is larger than the screen 103 (FIG. 5A), the image processor 123 scales down the image display area 112 (step S3). In other words, the image processor 123 adjusts the image display area 112 to be displayed within the screen 103.

Figure 5B:
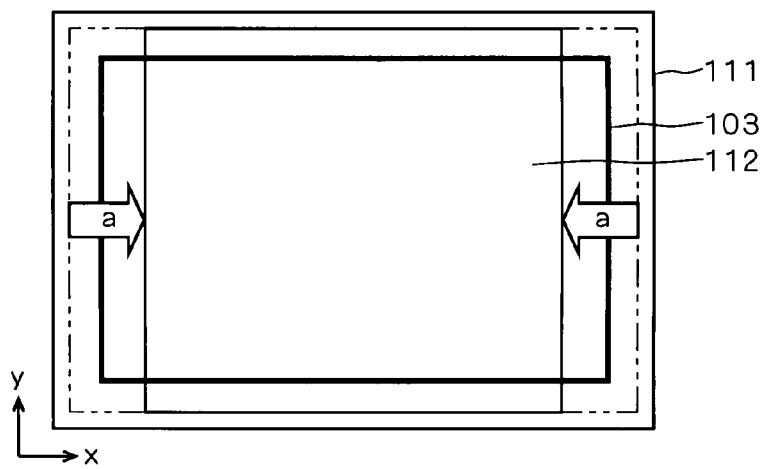

An example of scale-down method will now be described. First, the image processor 123 shifts the image display area 112 rightward along the x-axis by the number of pixels a (step S3a). At the same time, the image processor 123 scales down the image display area 112 leftward along the x-axis by twice the number of pixels a (step S3b). Thus obtained is the image display area 112 as shown in FIG. 5B scaled down by the number of pixels a from both left and right, respectively, without moving the center of the image display area 112. Herein, the phantom line indicates the image display area 112 yet to be scaled up/down and shifted, which will also apply to the drawings hereinafter used in describing scale-up/down of the image display area 112 and the like. The x-axis shift (step S3a) and x-axis scale-down (step S3b) are computed by the microcomputer 124, and then automatically programmed in the image processor 123.

Figure 5C:
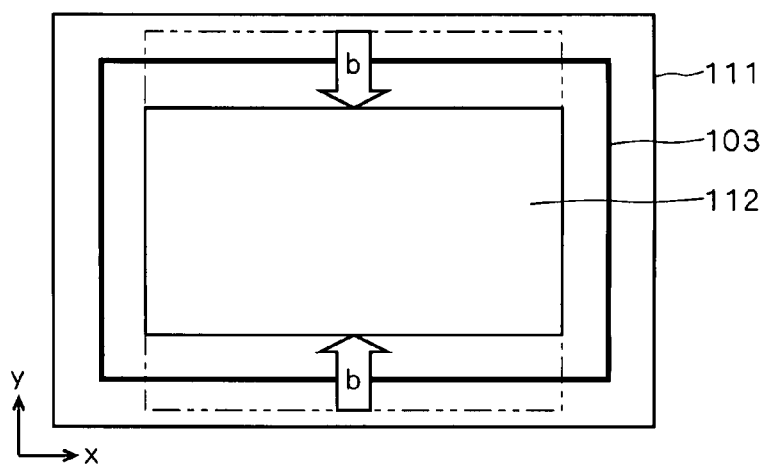
Figure 6:
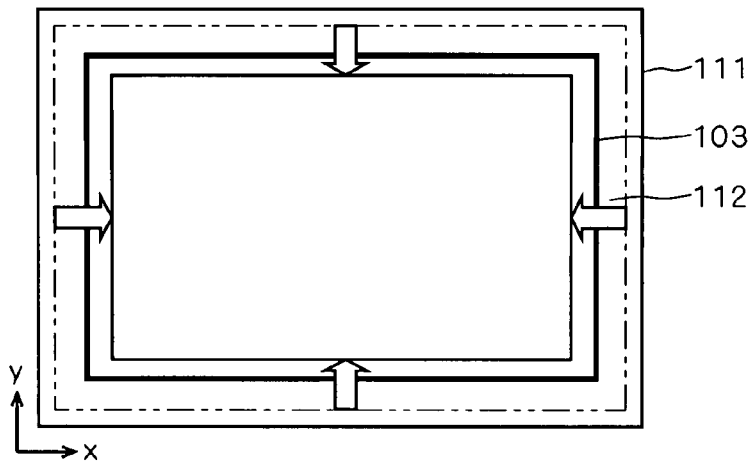

Next, the image processor 123 shifts the image display area 112 downward along the y-axis by the number of pixels b (step S3c). At the same time, the image processor 123 scales down the image display area 112 upward along the y-axis by twice the number of pixels b (step S3d). Thus obtained is the image display area 112 as shown in FIG. 5C scaled down by the number of pixels b from both top and bottom, respectively, without moving the center of the image display area 112. The y-axis shift (step S3c) and y-axis scale-down (step S3d) are computed by the microcomputer 124, and then automatically programmed in the image processor 123. The microcomputer 124 computes the x-axis shift (step S3a), x-axis scale-down (step S3b), y-axis shift (step S3c) and y-axis scale-down (step S3d) while keeping the ratio along the x- and y-axes. Alternatively, as shown in FIG. 6, the image display area 112 may be adjusted along the x- and y-axes at the same time.

As described above, the image processor 123 adjusts the image display area 112 in one translational degree of freedom along the z-axis. With such scale-down method, the image processor 123 is capable of scaling down the image display area 112 without moving the center of the image display area 112. When it is judged in step S2 that the image display area 112 is already smaller than the screen 103, the process proceeds into step S4 omitting step S3.

Figure 7:
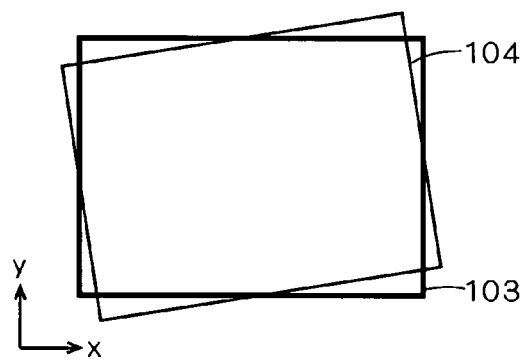
Figure 8:
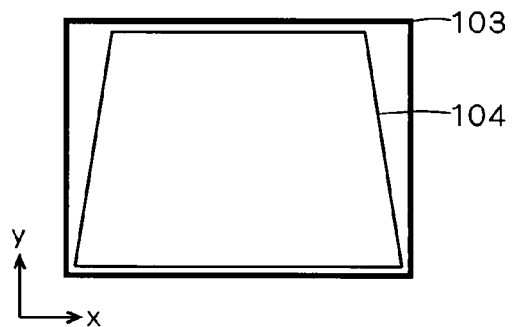
Figure 9:
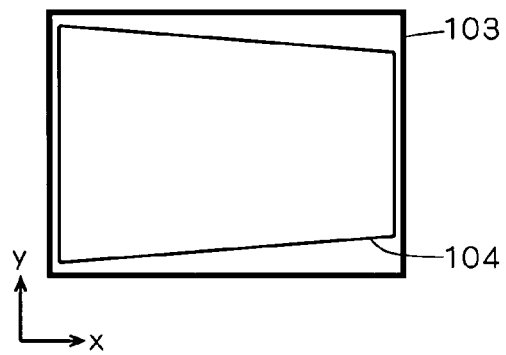
Figure 10:
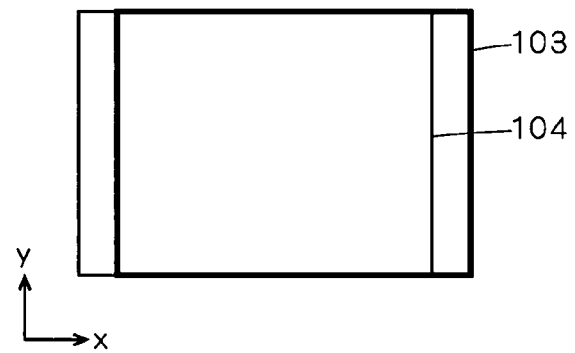
Figure 11:
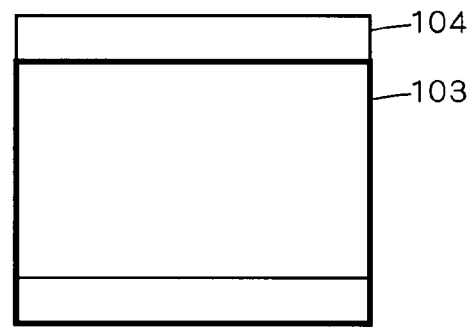

Next, the image-outline adjusting mechanism 150 positions the projection unit 102 in five degrees of freedom in total, i.e., three rotational degrees of freedom and two translational degrees of freedom such that a distortion in the image display area 112 is corrected and the image display area 112 falls within the screen 103 (step S4). When a z-axis rotational distortion appears in the image display area 112 as shown in FIG. 7, the shaft 75 shown in FIG. 2 is adjusted to rotate the projection unit 102 about the z-axis, so that the distortion is corrected. When a y-axis trapezoidal distortion appears in the image display area 112 as shown in FIG. 8, the shaft 72 shown in FIG. 2 is adjusted to rotate the projection unit 102 about the y-axis, so that the distortion is corrected. When an x-axis trapezoidal distortion appears in the image display area 112 as shown in FIG. 9, the shaft 74 shown in FIG. 2 is adjusted to rotate the projection unit 102 about the x-axis, so that the distortion is corrected. When an x-axis translational distortion appears in the image display area 112 as shown in FIG. 10, the shaft 71 shown in FIG. 2 is adjusted to translate the projection unit 102 along the x-axis, so that the center of the image display area 112 in the lateral direction is aligned with that of the screen 103 in the lateral direction. When a y-axis translational distortion appears in the image display area 112 as shown in FIG. 11, the shaft 73 shown in FIG. 2 is adjusted to translate the projection unit 102 along the y-axis, so that the center of the image display area 112 in the vertical direction is aligned with that of the screen 103 in the vertical direction.

Figure 12A:
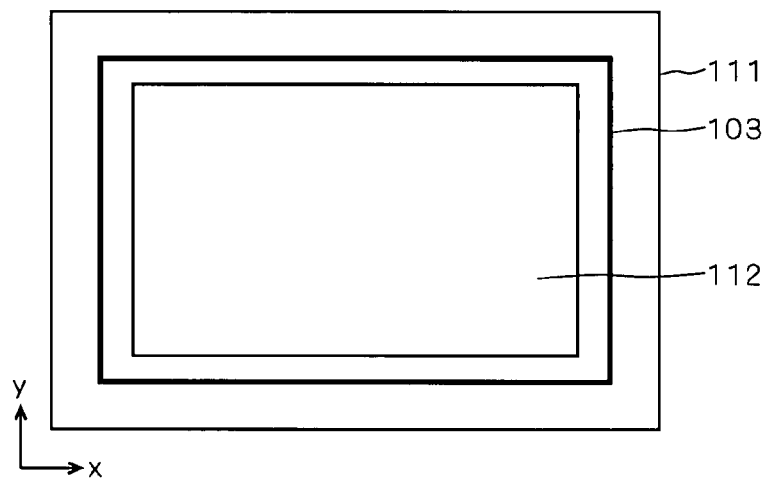

The image display area 112 having been adjusted by the image-outline adjusting mechanism 150 in step S4 is the same size as or smaller than the screen 103, as shown in FIG. 12A. Then, it is judged whether or not the image display area 112 is smaller than the screen 103 (step S5). When the image display area 112 is smaller than the screen 103, the image processor 123 scales up the image display area 112 to match the screen 103 (step S6).

Figure 12B:
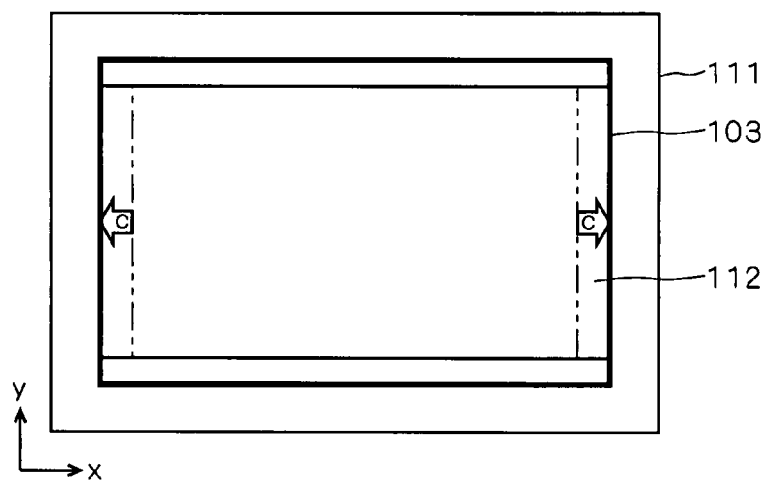

An example of scale-up method will now be described. First, the image processor 123 shifts the image display area 112 leftward along the x-axis by the number of pixels c (step S6a). At the same time, the image processor 123 scales up the image display area 112 rightward along the x-axis by twice the number of pixels c (step S6b). Thus obtained is the image display area 112 as shown in FIG. 12B scaled up by the number of pixels c from both left and right, respectively, without moving the center of the image display area 112. The x-axis shift (step S6a) and x-axis scale-up (step S6b) are computed by the microcomputer 124, and then automatically programmed in the image processor 123.

Figure 12C:
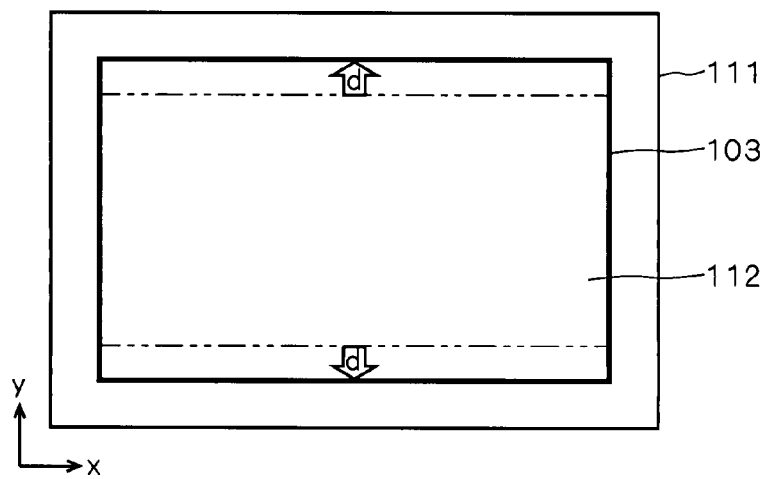
Figure 13:
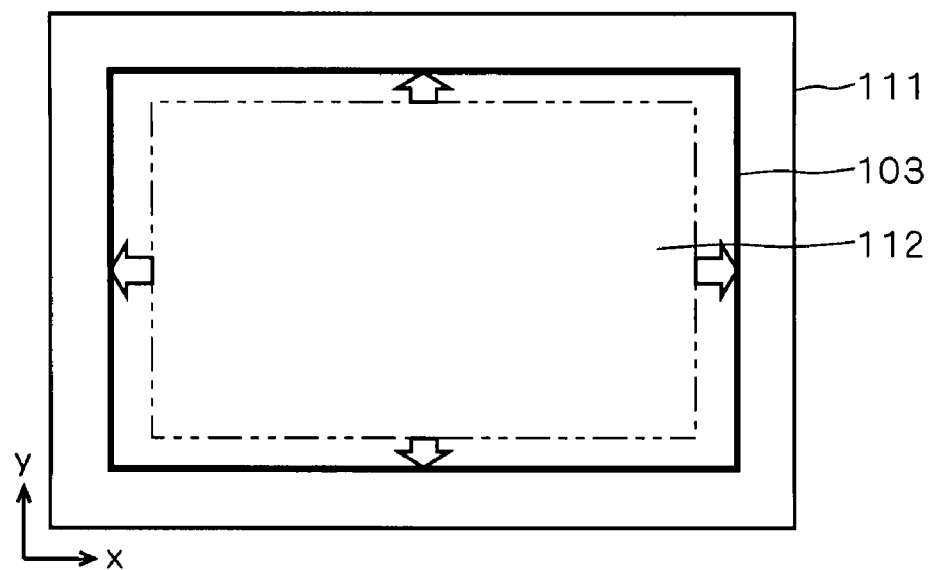

Next, the image processor 123 shifts the image display area 112 upward along the y-axis by the number of pixels d (step S6c). At the same time, the image processor 123 scales up the image display area 112 downward along the y-axis by twice the number of pixels d (step S6d). Thus obtained is the image display area 112 as shown in FIG. 12C scaled up by the number of pixels d from both top and bottom, respectively, without moving the center of the image display area 112. The y-axis shift (step S6c) and y-axis scale-up (step S6d) are computed by the microcomputer 124, and then automatically programmed in the image processor 123. The microcomputer 124 computes the x-axis shift (step S6a), x-axis scale-up (step S6b), y-axis shift (step S6c) and y-axis scale-up (step S6d) while keeping the ratio along the x- and y-axes. Alternatively, as shown in FIG. 13, the image display area 112 may be adjusted along the x- and y-axes at the same time.

As described above, the image processor 123 adjusts the image display area 112 in one translational degree of freedom along the z-axis. With such scale-up method, the image processor 123 is capable of scaling up the image display area 112 without moving the center of the image display area 112. When it is judged in step S5 that the image display area 112 already matches the screen 103, the process proceeds into step S7 omitting step S6.

Ideally, the above-described operations should correct a displacement in image outline, however, adjustments by the image-outline adjusting mechanism 150 which operates complicatedly might cause another displacement in another degree of freedom. In this manner, when another distortion still appears in the image display area 112 of the image-outline adjusting test signal relative to the screen 103 (step S7), the process returns to step S2 to repeat the adjustments in five degrees of freedom achieved by the image-outline adjusting mechanism 150 and adjustment in one degree of freedom achieved by the image processor 123 until the distortion is corrected. When all the adjustments are completed, an image of the image source 130 is displayed for final check (step S8).

According to the projection display of the present embodiment thus constructed, a z-axis translating mechanism is omitted from the image-outline adjusting mechanism 150, and the image processor 123 electrically scales up/down the image display area 112 to achieve the z-axis translation. This reduces the number, mass and costs of components constituting the image-outline adjusting mechanism 150. Further, this facilitates z-axis adjustment, and prevents degradation in quality of displayed image since the image-outline adjusting mechanism 150 corrects a rotational distortion or trapezoidal distortion. Furthermore, since the image-outline adjusting mechanism 150 is mechanically incapable of moving along the z-axis, the projection unit 102 is hardly displaced along the z-axis even with the occurrence of shakes or drops during transportation of products and the like. This allows readjustment along the z-axis by the image-outline adjusting mechanism 150 to be omitted when placing a product as transported.

Further, scaling up/down the image display area 112 without moving the center of the image display area 112 prevents additional translational displacements in two directions along the x- and y-axes from occurring along with the scale-up/down of the image display area 112.

While the image processor 123 is capable of adjusting the image display area 112 in one translational degree of freedom along the z-axis in the present embodiment, this is not a restrictive example. The image display area 112 may be adjusted in either one translational degree of freedom along the x-axis or one translational degree of freedom along the y-axis. The x-, y- and z-axes only need to be three directions different from one another, and may be defined in different manner from the present embodiment. Further, in the present embodiment, the image display area 112 is adjusted in five degrees of freedom by the image-outline adjusting mechanism 150 and in one translational degree of freedom by the image processor 123, however, this is not a restrictive example. The image display area 112 may be adjusted in two translational degrees of freedom by the image processor 123 and in four degrees of freedom (one translational degree of freedom and three rotational degrees of freedom) by the image-outline adjusting mechanism 150. Alternatively, the image display area 112 may be adjusted in three translational degrees of freedom by the image processor 123 and in three rotational degrees of freedom by the image-outline adjusting mechanism 150.

Second Preferred Embodiment

In the first preferred embodiment, the image display area 112 on the screen 103 is once scaled down by the image processor 123 in step S3, and adjusted in five degrees of freedom by the image-outline adjusting mechanism 150 in step S4, and then scaled up by the image processor 123 in step S6. In this embodiment, the image display area 112 is first adjusted in five degrees of freedom by the image-outline adjusting mechanism 150, and then scaled up/down by the image processor 123. Such method of adjustment will be described below. The construction and method of adjustment according to the present embodiment are assumed to be identical to those of the first preferred embodiment unless newly described.

Figure 14:
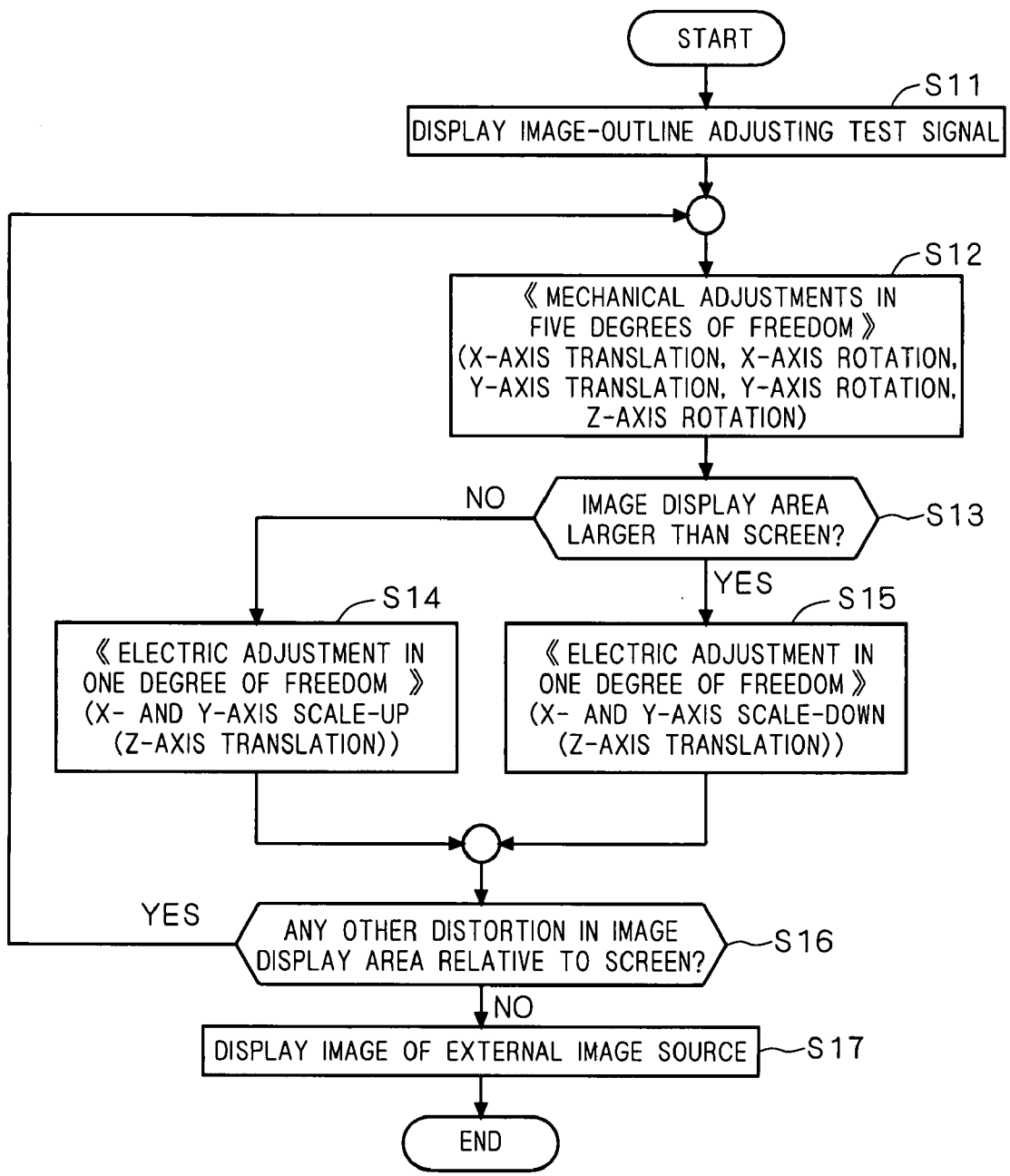
FIG. 14 is a flow chart showing a method of adjustment of a projection display according to a second preferred embodiment.

The method of adjustment achieved by a projection display according to the present embodiment of adjusting the image display area 112 to match the screen 103 will now be described with reference to the flow chart of FIG. 14. First, the test signal generator 122 outputs an image-outline adjusting test signal, and in response to the signal, the projection unit 102 projects and displays the image as shown in FIG. 4, for example, on the screen 103 (step S11).

Next, the image-outline adjusting mechanism 150 positions the projection unit 102 in five degrees of freedom in total, i.e., three rotational degrees of freedom and two translational degrees of freedom in parallel to the screen 103 such that a distortion in the image display area 112 is corrected and the image display area 112 falls within the screen 103 (step S12).

Next, it is judged whether or not the image display area 112 is smaller than the screen 103 (step S13). When the image display area 112 is smaller than the screen 103, the image processor 123 scales up the image display area 112 (step S14), and when the image display area 112 is larger than the screen 103, the image processor 123 scales down the image display area 112 (step S15). In this manner, the image processor 123 adjusts the image display area 112 in one translational degree of freedom along the z-axis.

When another distortion still appears in the image display area 112 of the image-outline adjusting test signal relative to the screen 103 (step S16), the process returns to step S12 to repeat the adjustments in five degrees of freedom achieved by the image-outline adjusting mechanism 150 and adjustment in one degree of freedom achieved by the image processor 123 until the distortion is corrected. When all the adjustments are completed, an image of the image source 130 is displayed for final check (step S17).

The projection display of the present embodiment thus constructed achieves the effects described in the first preferred embodiment. The present embodiment only needs to carry out either scale-up or scale-down of the image display area 112, and thus achieves adjustment of the image display area 112 in a shorter period of time than in the first preferred embodiment which sometimes carries out both scale-up and scale-down of the image display area 112.

Third Preferred Embodiment

The aforementioned preferred embodiments achieve the function equal to adjustments in six degrees of freedom only by a conventional image-outline adjusting mechanism with the adjustments in five degrees of freedom by the image-outline adjusting mechanism 150 and adjustment in one degree of freedom by the image processor 123. Even when a displacement is corrected by these adjustments, however, shakes or drops during transportation of products may cause a slight displacement of the image display area 112. To correct such distortion, adjustments generally need to be carried out only in three translational degrees of freedom along the x-, y- and z-axes. However, adjusting such slight displacement by the image-outline adjusting mechanism 150 might cause another displacement in another degree of freedom at the same time. In the present embodiment, the image processor 123 is capable of adjusting the image display area 112 also in the other two translational degrees of freedom as well as one translational degree of freedom along the z-axis. Herein, adjustments in the other two translational degrees of freedom refer to adjustments along the x- and y-axes.

Figure 15:
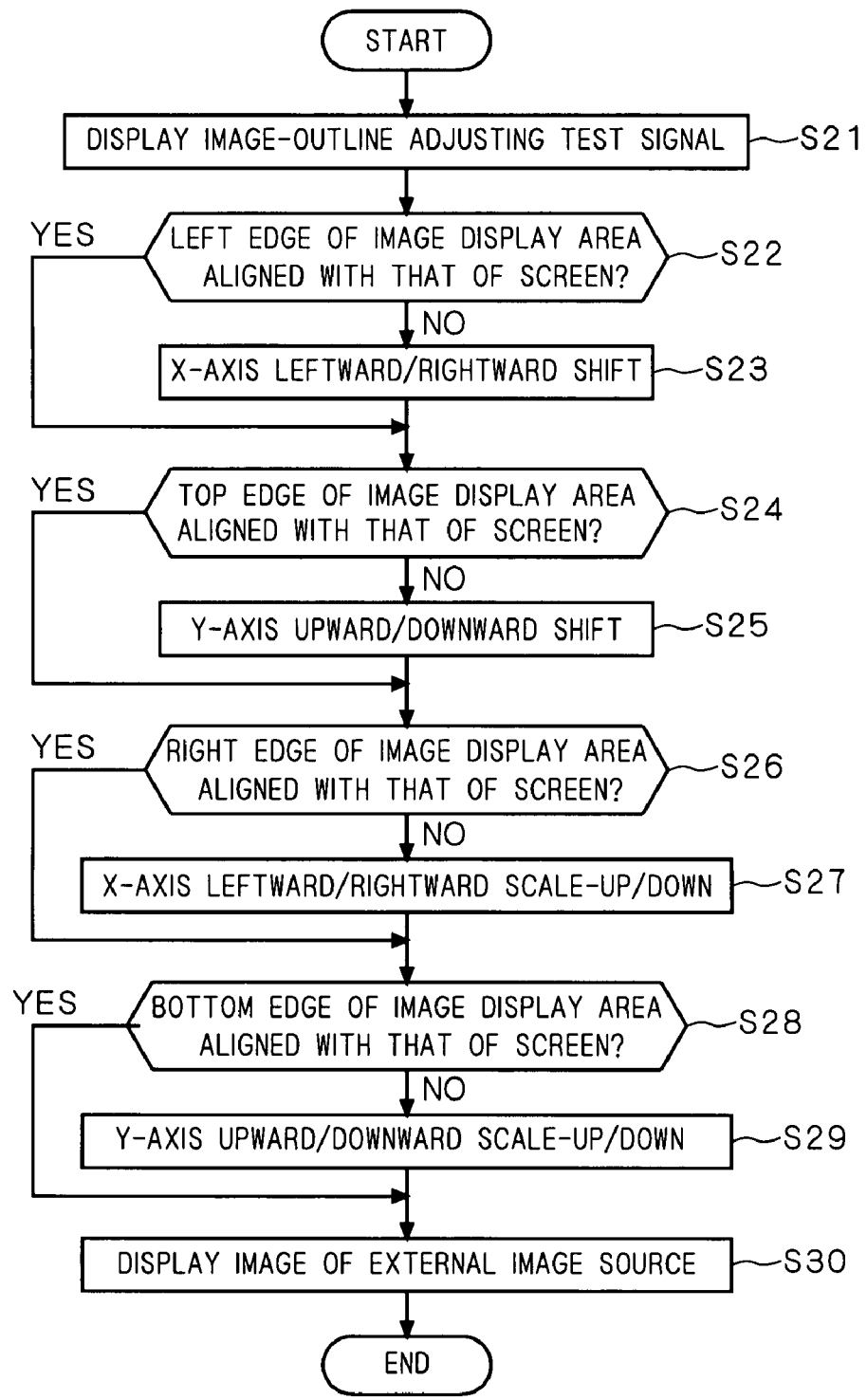
FIG. 15 is a flow chart showing a method of adjustment of a projection display according to a third preferred embodiment.

The present embodiment is implemented upon carrying out the adjustments according to the first and second preferred embodiments. The adjustments according to the first and second preferred embodiments refer to the adjustment in one translational degree of freedom by the image processor 123 and adjustments in five degrees of freedom by the image-outline adjusting mechanism 150. To correct a slight displacement after these adjustments, fine adjustment is made in the image display area 112 in three translational degrees of freedom by the image processor 123. This fine adjustment will now be described with reference to the flow chart of FIG. 15.

First, the test signal generator 122 outputs an image-outline adjusting test signal, and in response to the signal, the projection unit 102 projects and displays an image as shown in FIG. 4, for example, on the screen 103 (step S21).

Figure 16:
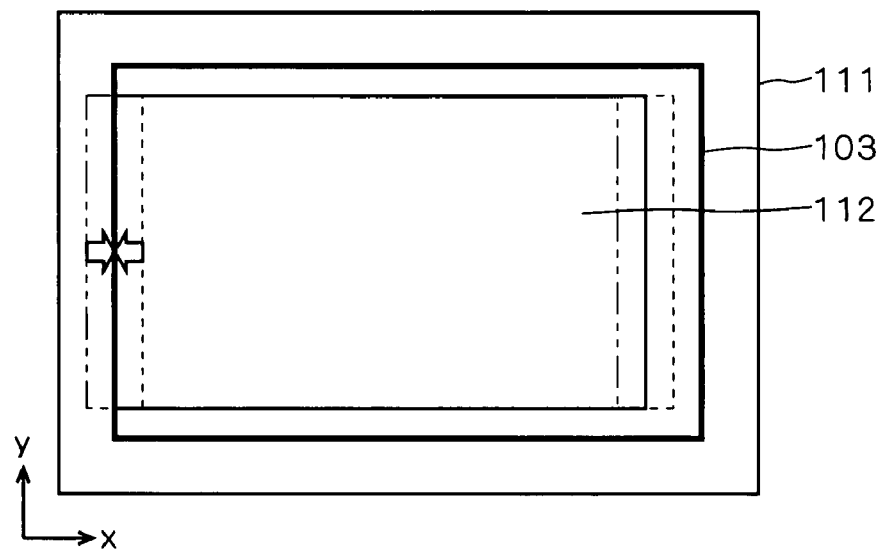
FIGS. 16 to 19 are diagrams showing the method of adjustment of the projection display according to the third preferred embodiment.

When the left edge of the image display area 112 is not aligned with that of the screen 103 (step S22), the image display area 112 is adjusted in one translational degree of freedom along the x-axis (step S23) among the three degrees of freedom adjusted by the image processor 123. Herein, as shown in FIG. 16, the image processor 123 shifts the left edge of the image display area 112 leftward when positioned on the right of the left edge of the screen 103 (as indicated by dotted lines), and shifts the left edge of the image display area 112 rightward when positioned on the left of the left edge of the screen 103 (as indicated by dash-double-dotted lines). In the present embodiment, x-axis scale-up/down is not carried out at this time, different from the first and second preferred embodiments.

Figure 17:
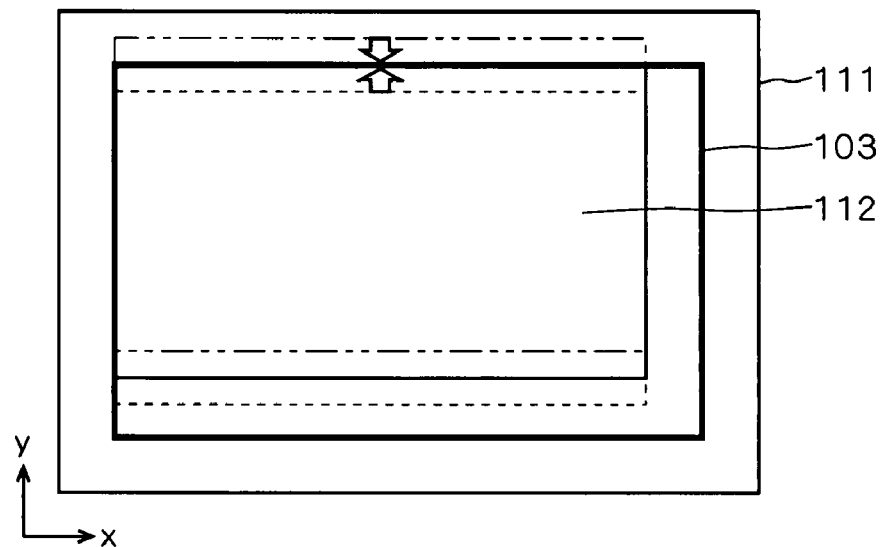

Next, when the top edge of the image display area 112 is not aligned with that of the screen 103 (step S24), the image display area 112 is adjusted in one translational degree of freedom along the y-axis (step S25) among the three degrees of freedom adjusted by the image processor 123. Herein, as shown in FIG. 17, the image processor 123 shifts the top edge of the image display area 112 upward when positioned below the top edge of the screen 103 (as indicated by dotted lines), and shifts the top edge of the image display area 112 downward when positioned above the top edge of the screen 103 (as indicated by dash-double-dotted lines). In the present embodiment, y-axis scale-up/down is not carried out at this time, different from the first and second preferred embodiments.

Figure 18:
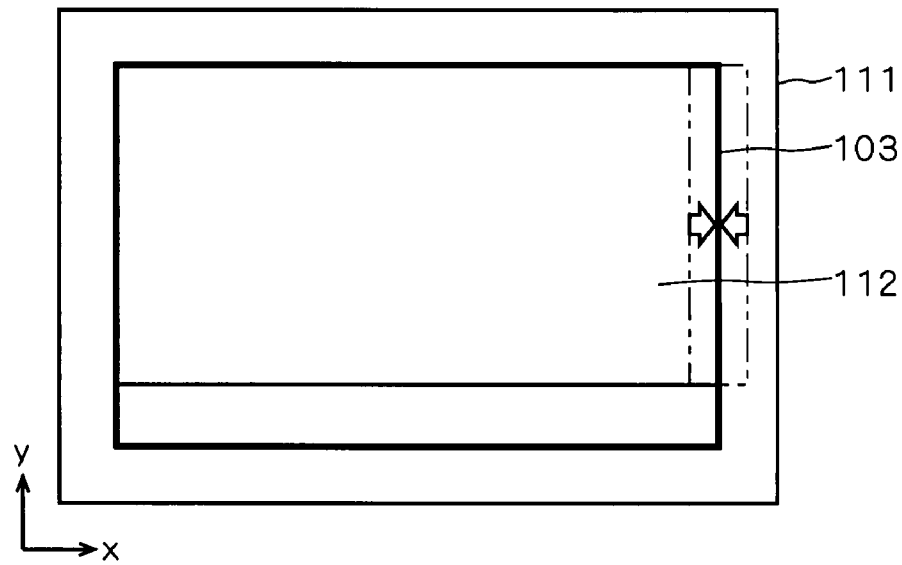

When the image display area 112 does not match the screen 103, the image display area 112 is adjusted in one translational degree of freedom along the z-axis among the three degrees of freedom adjusted by the image processor 123. An example of such adjustment method will now be described. When the right edge of the image display area 112 is not aligned with that of the screen 103 (step S26), the image processor 123 scales up/down the image display area 112 along the x-axis (step S27). Herein, as shown in FIG. 18, the image processor 123 scales up/down the image display area 112 along the x-axis without moving the left edge of the image display area 112, to thereby align the right edge of the image display area 112 with that of the screen 103. In the present embodiment, the x-axis shift is not carried out at this time, different from the first and second preferred embodiments.

Figure 19:
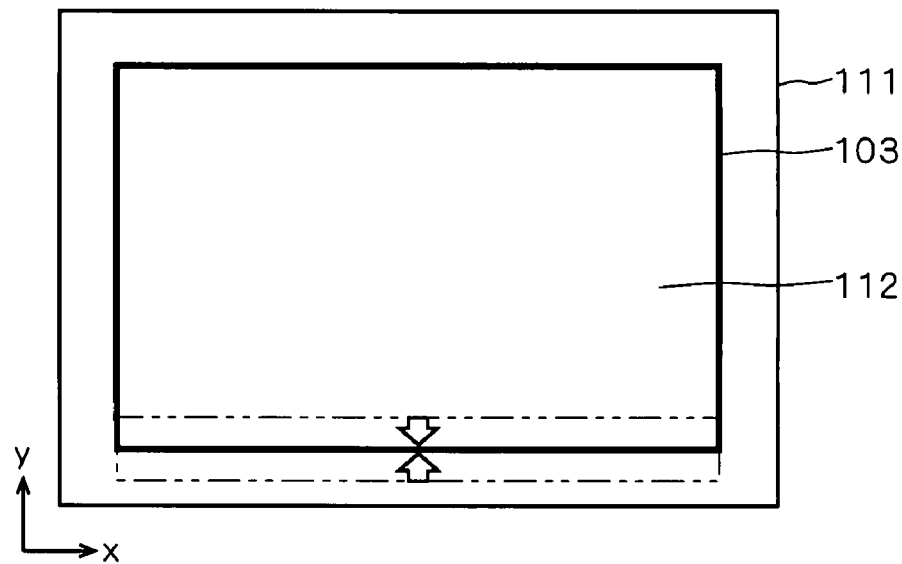

When the bottom edge of the image display area 112 is not aligned with that of the screen 103 (step S28), the image processor 123 scales up/down the image display area 112 along the y-axis (step S29). Herein, as shown in FIG. 19, the image processor 123 scales up/down the image display area 112 along the y-axis without moving the top edge of the image display area 112, to thereby align the bottom edge of the image display area 112 with that of the screen 103. In the present embodiment, the y-axis shift is not carried out at this time, different from the first and second preferred embodiments.

When all the adjustments are completed, an image of the image source 130 is displayed for final check (step S30). It is noted that the image display area 112 may be shifted toward the inside of the screen 103 so as to provide an image-undisplayed area within the screen 103.

According to the projection display of the present embodiment thus constructed, the image processor 123 is capable of adjusting the image display area 112 in three translational degrees of freedom individually when shakes or drops during transportation of products and the like cause a slight displacement. This allows the image display area 112 to be adjusted without repeating the adjustments as in the first preferred embodiment, so that fine adjustment can easily be made to a displacement in image outline in a short period of time.

While the invention has been shown and described in detail, the foregoing description is in all aspects illustrative and not restrictive. It is therefore understood that numerous modifications and variations can be devised without departing from the scope of the invention.

What is claimed is:

1. A projection display that is adjustable in six degrees of freedom, comprising:
    a projection unit projecting an image on a screen;
    an image processor configured to adjust an image display area where said image is projected on said screen by processing an image signal to be input to said projection unit; and
    an image-outline adjusting mechanism supporting said projection unit and configured to adjust said image display area by positioning said projection unit, wherein
    the configuration of said image-outline adjusting mechanism is operationally limited to positioning said projection unit according to no more than five of said six degrees of freedom, and
    said image processor is configured to adjust said image display area in the rest of said six degrees of freedom that cannot be achieved by operation of said image-outline adjusting mechanism, said rest of said six degrees of freedom including one translational degree of freedom.

2. The projection display according to claim 1, wherein
    said image processor scales up/down said image display area in adjusting said image display area, and
    said image-outline adjusting mechanism positions said projection unit in three rotational degrees of freedom and two translational degrees of freedom in parallel to said screen.

3. The projection display according to claim 2, wherein
    said image processor scales up/down said image display area without moving the center of said image display area.

4. The projection display according to claim 1, wherein
    said image processor is configured to adjust said image display area also in two other translational degrees of freedom of said six degrees of freedom as well as said one translational degree of freedom.

5. A method of adjusting a projection display, wherein
    said projection display includes:
        a projection unit projecting an image on a screen;
        an image processor configured to adjust an image display area where an image is projected on said screen by processing an image signal to be input to said projection unit; and
        an image-outline adjusting mechanism supporting said projection unit and configured to adjust said image display area by positioning said projection unit, wherein
        said image processor is configured to adjust said image display area in one translational degree of freedom by scaling up/down said image display area without moving the center of said image display area, and
        said image-outline adjusting mechanism is configured to position said projection unit in five degrees of freedom except for said one translational degree of freedom, said five degrees of freedom including three rotational degrees of freedom and two translational degrees of freedom in parallel to said screen,
    said method comprising the steps of:
    (a) scaling down said image display area by said image processor;
    (b) after said step (a), positioning said projection unit by said image-outline adjusting mechanism in said five degrees of freedom; and
    (c) after said step (b), scaling up said image display area by said image processor.

6. A method of adjusting a projection display, wherein
    said projection display includes:
        a projection unit projecting an image on a screen;
        an image processor configured to adjust an image display area where an image is projected on said screen by processing an image signal to be input to said projection unit; and
        an image-outline adjusting mechanism supporting said projection unit and configured to adjust said image display area by positioning said projection unit, wherein
        said image processor is configured to adjust said image display area in one translational degree of freedom by scaling up/down said image display area without moving the center of said image display area, and
        said image-outline adjusting mechanism is configured to position said projection unit in five degrees of freedom except for said one translational degree of freedom, said five degrees of freedom including three rotational degrees of freedom and two translational degrees of freedom in parallel to said screen,
    said method comprising the steps of:
    (a) positioning said projection unit by said image-outline adjusting mechanism in said five degrees of freedom; and
    (b) after said step (a), scaling up/down said image display area by said image processor.

7. A method of adjusting a projection display, wherein
    said projection display includes:

a projection unit projecting an image on a screen;

an image processor configured to adjust an image display area where an image is projected on said screen by processing an image signal to be input to said projection unit; and an image-outline adjusting mechanism supporting said projection unit and configured to adjust said image display area by positioning said projection unit, wherein said image processor is configured to adjust said image display area one translational degree of freedom, said image processor also configured to adjust said image display area in the other two translational degrees of freedom as well as said one translational degree of freedom, and said image-outline adjusting mechanism is configured to position said projection unit in five degrees of freedom except for said one translational degree of freedom, said method comprising the steps of:

(a) adjusting said image display area in said one translational degree of freedom by said image processor and in said five degrees of freedom by said image-outline adjusting mechanism; and (b) finely adjusting said image display area in said one and said other two translational degrees of freedom by said image processor to correct a slight displacement occurred after said step (a).

* * * * *